(No Model.)
W. A. REID.
FIRE EXTINGUISHING APPARATUS.
No. 312,899. Patented Feb. 24, 1885.
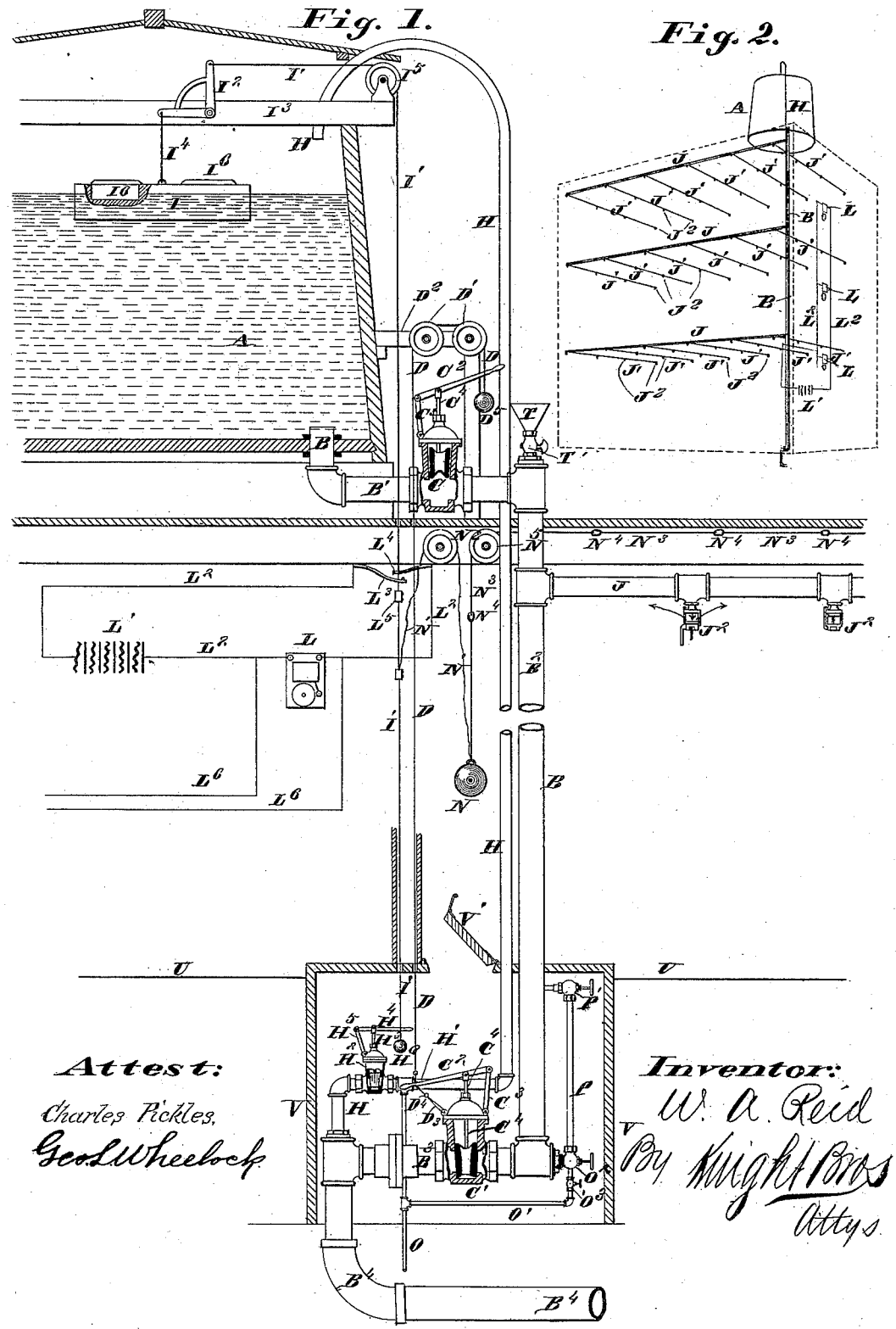
Attest:
Charles Pickles.
Geo. L. Wheelock.
Inventor:
W. A. Reid
By Knight Bros
Attys.

United States Patent Office.

WILLIAM A. REID, OF ST. LOUIS, MISSOURI, ASSIGNOR TO THE N. O. NELSON MANUFACTURING COMPANY, OF SAME PLACE.

FIRE-EXTINGUISHING APPARATUS.

SPECIFICATION forming part of Letters Patent No. 312,899, dated February 24, 1885.

Application filed June 25, 1884. (No model.)

*To all whom it may concern:*

Be it known that I, WILLIAM A. REID, of the city of St. Louis, in the State of Missouri, have invented a certain new and useful Improvement in Automatic Fire-Extinguishers, of which the following is a full, clear, and exact description, reference being had to the accompanying drawings, forming part of this specification, and in which—

Figure 1 is a vertical section, part in elevation, and Fig. 2 is a diagram in perspective.

My invention relates to an automatic fire-extinguisher for buildings; and it consists in features of novelty hereinafter fully described, and pointed out in the claims.

Referring to the drawings, A represents a tank located on the top of a building or other suitable support and adapted to hold liquid, as brine or water.

B represents a pipe connecting the tank with the city main or other water-supply, and it preferably has an upper horizontal part, $B'$, a vertical part, $B^2$, a lower horizontal part, $B^3$, and a part, $B^4$, leading to the main or supply. In this pipe, preferably in the parts $B'$ and $B^3$, are valves C and $C'$, provided each with a lifting-lever, $C^2$, fulcrumed to the housing of the valve by a link, $C^3$, as shown in Fig. 1, the valves having stems or rods $C^4$ connecting them to the levers by passing through the tops of the housings. The outer ends of the levers of the valves are connected by means of a wire or cord, D, passing over pulleys $D'$, supported on an arm, $D^2$, secured to the tank. When the apparatus is not in use, the lower valve is held closed and the upper one open by means of a wire or cord, $D^3$, connecting the outer end of the lower lever to the housing of the valve. The wire or cord $D^3$ has a seal, $D^4$, and as soon as this seal is broken a weight, $D^5$, connected to the outer end of the upper lever, closes the upper valve and opens the lower one.

Connected to the pipe B on the supply side of the lower valve, $C'$, is a pipe, H, that extends upward and communicates with the tank A, and it has a horizontal part, $H'$, supplied with a valve, $H^2$, connected by means of its stem $H^3$ to a lever, $H^4$, fulcrumed by means of a link, $H^5$, to the housing of the valve. The outer end of this lever is connected by means of a wire or cord, $I'$, to a float, I, in the tank, the connection preferably being made through means of a bell-crank lever, $I^2$, pivoted to a support, $I^3$, the wire $I'$ being made fast to one arm and the float, by means of a wire or cord, $I^4$, to the other. The wire or cord $I'$ passes over a pulley, $I^5$, on the support $I^3$. The float consists, preferably, of a piece of wood coated with copper, so that it will not become saturated with the liquid and its specific gravity thus changed; and it preferably has openings on top to receive one or more weights, $I^6$, by which the weight of the float may be regulated at will. It will thus be seen that when the float falls (by reason of the water in the tank evaporating or passing out to extinguish the fire, as stated hereinafter) it will pull up through means of the connecting-wire $I'$ on the outer end of the lever $H^4$, thereby opening the valve $H^2$, permitting the water to pass through the pipe H to supply the tank, and as soon as the float rises again the valve is closed by a weight, $H^6$, connected to the outer end of the lever $H^4$. The tank is thus kept supplied at all times.

J represents a pipe connected to the pipe B, and a number of smaller pipes, $J'$, are connected to that J. (See diagram, Fig. 2.) These pipes J $J'$ are provided with extinguishers $J^2$, preferably such as was patented to C. C. Walworth, July 10, 1883, No. 281,169.

The operation is as follows: In case of a fire the fusible solder of the extinguishers explodes and the extinguishers open, and the liquid passes from the tank through the pipes B, J, and $J'$, and out through the extinguishers. As the water escapes from the tank to a sufficient amount the float falls, opening the valve $H^2$, as described, allowing water to enter the tank through the pipe H to keep it supplied. We will now suppose that the fire is discovered by some one, who lifts or raises the outer end of the lever $C^2$ of the valve $C'$, breaking the seal $D^4$, thereby opening this valve and closing that C, which turns on the full supply from the main and prevents further discharge from the tank, as well as preventing the water entering the tank through the pipe B, owing to its force being greater than that of the water in the tank. The object of turning the water on directly from the main or supply is, that a greater force and amount of water is obtained.

When the float falls, an alarm may be sounded by means of an electric bell, L, battery L', wires L², spring L³, to which one of the wires is connected, bar L⁴, to which the other wire is connected, and a block, L⁵, on the wire I', that comes against the spring as the float falls and raises it against the bar to connect the circuit. There may be a number of these bells, if desired, connected to the main wires L² by auxiliary wires L⁶.

In case, from some cause or other, the float should not operate as above described, and as it is intended it should—as, for instance, some of the parts might become rusty by long standing, so as not to work freely, so that the liquid in the tank will become exhausted before the fire is extinguished—it is desirable to have some automatic means to open the valve H², and this I accomplish by a very cheap and simple contrivance, consisting of a weight, N, connected to the wire I' by a wire or cord, N', passing over a pulley, N². Connected to the weight is also a wire, N³, consisting of sections united by fusible solder, as shown at N⁴. This wire passes over a pulley, N⁵, and takes the strain of the weight off the wire N', and this wire N³ extends around under the floor of the building over the pipes J J'. The fusible solder in this wire will become melted soon after the extinguishers are opened, and if the valve H² has not been opened by the float, the falling of the weight N will open it.

I provide the pipe H with a small waste-pipe, O, so that the water will leak out of the pipe H after it has been used and not freeze up in cold weather. The pipe B also has a waste-pipe, O', and waste cock O². The pipe O' has a valve or cock, O³.

Connecting with the valve or cock O² is a glass tube, P, extending upward and connecting with the pipe B at its upper end, where it is provided with a valve, P'. The valves O² and P' are left open, except when the pipe B is in use, and may be left open then. By opening the valve O³ the water can be drained out of the pipe B below freezing-line in winter, and the gage P acts as an indicator to show the height of the water in the pipe.

When the pipe has been emptied to below freezing-point, it may be filled with ammonia, brine, or some other liquid that will not freeze except at a very low temperature, and the pipe is thus kept full ready for immediate action.

The pipe is filled through a funnel, T, provided with a valve, T'. This valve also acts to permit the escape of air that may accumulate in the pipe B.

The parts below the ground-line U may be inclosed in a suitable housing or box, V, provided with a hinged lid or cover, V', through which the working parts may be reached.

Each story of the building is, or at least may be, provided with the pipes J J' and alarm-bells.

I claim as my invention—

1. The combination of the tank, float, supply-pipe, valve in the supply-pipe, weight to close the valve, wire connecting the valve to the float to lift the former when the latter falls, and block L⁵ on the wire to operate an alarm, as set forth.

2. In a fire-extinguisher, the combination of the tank, float, supply-pipe, discharge-pipe, wire connecting the float to a valve in the supply-pipe, pipe B, provided with valves connected by a wire, wire for holding the lower valve closed and the upper valve open, and weight for closing the upper valve automatically when the lower one is opened, substantially as and for the purpose set forth.

3. In a fire-extinguisher, the combination of the tank, float, supply-pipe, discharge-pipe, wire connecting the float to a valve in the supply-pipe, and pipe B, provided with valves, operating substantially as set forth, and with a valve and funnel at its upper end and a gage and valved drain-pipe at its lower end, for the purpose specified.

4. The combination of the tank, float, supply-pipe, valve in the supply-pipe, weight to close the valve, wire connecting the valve to the float to lift the former when the latter falls, wire sections connected by fusible solder, weight supported by the sections, and wire connecting the weight to the valve and float-wire, as set forth.

WILLIAM A. REID.

In presence of—
GEO. H. KNIGHT,
SAML. KNIGHT.